US Patent Office — 3,342,629 — Patented Sept. 19, 1967

3,342,629
WOOD TREATING PROCESS AND PRODUCT THEREOF
George A. Martin, Tullahoma, Tenn., assignor to Callery Chemical Company, Pittsburgh, Pa., a corporation of Pennsylvania
No Drawing. Filed Oct. 24, 1963, Ser. No. 318,527
6 Claims. (Cl. 117—136)

This invention relates to a method of treating and protecting wood and to the wood products resulting therefrom, and more particularly this invention relates to improving the dimensional stability of wood and making it fire-retardant and resistant to wood destroying organisms.

There is a growing need for fire-retardant woods or non-combustible substitutes. The more successful efforts to reduce wood's combustibility relate to the incorporation of fire-retardant chemicals in the wood. A suitable fire-retardant will raise the ignition temperature of wood, and will inhibit its flaming combustion, and will inhibit the glowing of residual charcoal. Although fire-retardant wood may be completely destroyed in a full scale fire, fire-retardancy may be of critical importance in preventing the initial development of a fire. According to my invention fire-retardant chemicals are deposited within the internal cell and fiber structures of wood by the chemical interaction of a volatile, highly miscible impregnant with various constituents of the wood.

Wood is also subject to destruction by simple plants including fungi and molds and by insects, including termites, carpenter ants and related species. A further advantage of my invention is that these chemicals which provide a fire-retardance also impart insecticidal and fungicidal properties to the wood thereby decreasing or eliminating destruction by these various pests.

Wood is a complex material both anatomically and chemically. A substantial proportion of the weight of freshly cut wood is water which must be removed by proper drying or seasoning in order to render it useful for construction. In drying green wood there is generally no substantial change in either the strength or volume of the wood until a point is reached, called the fiber saturation point, which for most woods varies between 25 and 35% moisture and is generally arbitrarily stated to be 30% moisture. As the wood is dried below the fiber saturation point a noticeable increase in the strength of the wood is observed as well as a decrease in the volume. It is believed that the first water to leave wood is primarily free water found within the cell cavities, loss of which does not affect the physical properties, and that below the fiber saturation point water is driven from the cell walls with a change in the physical properties of the wood. Wood is ordinarily used in structural applications at a point well below its fiber saturation point. Dry wood, for example containing 6% moisture, is very hygroscopic such that the moisture content of the wood undergoes a corresponding change with the constantly changing relative humidity of the atmosphere. Many problems result from external volume changes in seasoned structural wood due to absorption and desorption of moisture. Furthermore, in drying green wood great care must be exercised to insure that the wood does not dry unevenly so as to avoid shrinkage defects such as checks, cracks, warp and the like. As a further result of my invention the treating process will dehydrate the wood evenly by the reaction of the impregnant with the water therein without effecting a structural change in the wood. Additionally this internal reaction results in a substantial decrease in the hygroscopicity of the wood, such that it is very dimensionally stable under varying humidity conditions.

According to this invention wood which is partially moist, preferably near its fiber saturation point, is impregnated with a tri(lower)alkyl borate. Trimethyl borate is preferred because of its ready availability and low cost. Also satisfactory are the triethyl, tripropyl, and tributyl borates. The wood is treated by permitting the alkyl borate to soak into the wood to a suitable depth, preferably under pressure so that the penetration time is substantially lessened. The trialkyl borates are volatile liquids which react with water to form boric acid and the corresponding alcohol. As the trialkyl borate penetrates the wood during impregnation a substantial amount of the trialkyl borate reacts with the water in the wood to form boric acid. Other boron containing compounds, which have not been fully characterized, are also formed in the wood. There is also evidence that the boric acid itself reacts with wood fibers or constituents over a period of time. By these reactions the boron is transformed into a non-volatile boron constituent in the wood imparting to it not only a fire-retardancy but also an insecticidal and fungicidal property. Furthermore in treating the wood the reaction with the water by the trialkyl borate serves as a seasoning or dehydrating agent. Wood so treated exhibits a striking degree of dimensional stability under varying conditions of temperature and humidity. It is believed that the trialkyl borate reaction products effect a blocking of the hygroscopic centers inside the wood which are responsible for the attraction of water under conditions of high humidity.

The depth and degree of impregnation is, to an extent, a matter of choice, however I have discovered that in treating thick pieces of wood, for example 4 inches thick, heavy treatment can be accomplished to the center. I have ascertained, in order to obtain a desirable fire-retardancy, that the wood should be heavily treated to a depth of ⅛ inch to ¼ inch. Heavily treated wood should contain at least about 0.7 pound of boron per cubic foot of wood in the form of non-volatile boron reaction products, which is equivalent to 4 pounds of boric acid or 6½ pounds of trimethyl borate reactant per cubic foot of wood. Superior results are obtained if about one pound of boron reaction product, measured as boron, is deposited per cubic foot of treated wood. Wood so treated exhibits a striking degree of fire-retardancy. For some reason which I have not ascertained as yet the fire-retardancy of the wood appears to improve somewhat with age. Furthermore, thorough soaking of the wood in water followed by a drying does not materially effect its fire-retardancy. The wood so treated is highly resistant to the attack of wood destructive insects such as termites and to wood destroying fungus. This wood is additionally highly dimensionally stable under varying conditions of temperature and humidity.

I have discovered, in order to obtain an effective deposition of boron reaction products, that the wood to be treated must not be completely dry, and I prefer that the moisture content be at approximately the fiber saturation point of the wood, that is about 30% moisture. I have also discovered that high water content (green wet wood) appears to interfere somewhat with the penetration of the treating fluid, possibly because of a blocking concentration of boron reaction products near the surface, and therefore it is preferred that the wood be partially dried in order to permit the treatment to reach a good depth in the wood.

My invention is further illustrated by specific experiments which I have conducted as follows:

*Example 1.*—A four foot length of green loblolly pine being 4 inches square in cross section and containing 92% water was heated and dried under vacuum to a moisture content of 29.8% water prior to treatment. This wood was placed in a pressure chamber and after pulling a high vacuum to eliminate the air a mixture of trimethyl borate-methanol azeotrope was introduced and left to stand for 24 hours at a pressure of 25 p.s.i.g. The treating solution was then removed and by calculation 4730 milliliters of trimethyl-borate was consumed by the treatment. A high vacuum was placed on the chamber and the vapors removed were condensed in a water cooled condenser and a cold trap for 70 hours. This treatment removes unreacted trimethyl borate and the methyl alcohol from the wood. The condensed material was measured and analyzed for boron content. Calculations showed that 1.15 pounds of boron per cubic foot of wood in the form of non-volatile boron reaction products was deposited in the wood. The wood was sanded on all sides to remove the outside 1/16 inch and the chips from a 1/2-inch hole bored through the center of the wood 14 inches from one end were analyzed for boric acid. It was ascertained that the boric acid content was 1 pound per cubic foot of wood (15% of the total boron) with the remaining boron material in the form of non-volatile boron reaction products other than boric acid. The wood was cut into longitudinal boards and representative pieces were submitted to a combustion test in a fire tube tester in accordance with procedures adopted by the Forest Products Laboratory of the U.S. Department of Agriculture. These pieces demonstrated excellent flame-retardant properties including the strip found in the center of the treated piece of wood. Another representative piece was tested after standing in the open air for 18 days. Three other pieces were put in distilled water and left to stand for 5 days. Two were taken out and dried for two days and burned and the third was taken out and dried for 30 days and submitted to a flame test. In all cases these boards demonstrated excellent flame-retardant properties. Analysis of the wood which was submitted to the distilled water leaching treatment showed that approximately 1/3 of the boron had been leached out yet there was no appreciable decrease in the fire-retardant properties. The tests also indicated that standing time improved flame-proofing.

Example 2.—A piece of loblolly pine similar in size to that of Example 1 was dried to about 30% moisture under closely controlled conditions and then was treated with a solution of trimethyl borate azeotrope at 25 p.s.i.g. and 60° C. for 20 hours. A total of 4800 milliliters of treating solution was absorbed over this period of time. Of this total 2040 milliliters were absorbed in the first hour, 3900 in the first 2 hours, 4540 in the first 4 hours, and only 50 milliliters were absorbed in the last 10 hours. This provides a basis for establishing minimum treating time. After treatment this wood was dried at 65° C. and 26 inches of mercury for 24 hours to remove volatiles. Chips from a 1/2-inch hole bored into the center of this wood were analyzed and found to contain .92 pound of boron per cubic foot of wood. This wood was cut into longitudinal sticks and was submitted to flame tests over a period of time. The wood that was burned the day after final drying possessed excellent flame-proofing. The remaining wood was burned 27 days later and possessed even a better flame-proofing than the wood burned the day after treatment. It appears that time improves the flame-retarding properties of the treated wood.

Example 3.—A similar piece of green lumber, 4 inches by 4 inches by 4 feet was dried to 44% water and treated with the methyl borate azeotrope solution at 15 p.s.i.g. for 24 hours. A total of 3,790 cc. were absorbed by the wood. The wood was dried over a period of three days to remove volatile materials. The cuttings from a hole 1 inch in diameter through the center of the wood, 5 inches from one end was analyzed and found to be trimethyl borate reaction products calculated as 1.17 pounds of boron per cubic foot of wood. The inside of the bored hole was treated with curcumin indicator solution and it was found that treatment was complete to the center of the piece of wood, although somewhat lighter in the center than at the surface. This piece of wood was also cut into longitudinal strips and submitted to fire-retardancy tests. It was discovered that the surface, which had heavy treatment to a depth of 3/4-inches, possessed excellent flame-proofing. The interior pieces which were lightly treated burned in a hot flame but immediately extinguished upon removal of the flame with no afterglow.

Example 4.—A green piece of loblolly pine containing over 90% moisture was immediately treated with methyl borate azeotrope at 25 p.s.i.g. for 16 hours at 63° C. The excess treating fluid was removed and the wood was then dried at a high temperature for 48 hours to an extremely light, dark brown, charcoal-like substance. When submitted to an oxygen gas flame, it glowed red hot but did not flame and the glow disappeared as soon as the flame was removed. The experiment shows that green wood can be successfully treated and that treated wood which has been charred under excessive temperatures possesses excellent fire-retardant characteristics.

Example 5.—Three 1 inch by 4 inch strips of heavily treated wood were accurately measured and then subjected to changes in relative humidity between 30% relative humidity and 70% relative humidity. From many measurements along the length it was ascertained that the cross sectional dimensions of the sticks varied from 0% change in dimension up to a maximum of 1.4% variation, with an overall average of 0.5% variation. This demonstrates the dimensional stability across the grain of treated wood containing one pound per cubic foot of boron.

I have discovered from these and other experiments that any species of wood including cottonwood, oak, ash, maple and yellow pine can very successfully be treated with tri(lower)alkyl borates to protect the wood against fire. The treating time and pressure will vary somewhat depending on the species of wood under treatment. For some applications it is desired that the wood be treated to the very core. In other applications it is only necessary to provide a light, surface treatment of the wood. Thus, the effective depth to which wood is treated depends on its ultimate usage. If a surface treatment is all that is desired, then the wood can be submitted to the treating bath without the application of pressure. However, if a depth penetration is desired, I have found it advantageous to submit the wood to pressure treatment of 1 to 2 atmospheres or greater. I have discovered that excellent properties are acquired if the wood is treated such that boron reaction products, including boric acid, are contained in the wood at the rate of 1 pound (measured as boron) per cubic foot. This is equivalent to a treatment of 10 pounds of trimethyl borate per cubic foot of wood. However, I have also determined that as little as 0.7 pound boron per cubic foot will impart good protective properties to the wood as well as improved dimensional stability. For extra heavy treatment and corresponding protection, I have deposited boron reaction products in yellow pine to the extent of 2 pounds of boron per cubic foot of wood. Wood treated according to this invention has been found to retain good machineability characteristics and to possess paint retention properties equal to untreated wood.

The reaction of the alkyl borate releases the corresponding lower alkyl alcohol within the wood which is removed with any excess treating fluid. The removal may be accomplished by submitting the wood to a forced drying under vacuum or by age drying in an open area over a suitable period of time. Since the corresponding alcohol is deposited in the wood by the reaction as an inherent result of this process, I have found it satisfactory to use the tri(lower)alkyl borate in the form of the mixture of the tri(lower)alkyl borate with its corresponding alcohol and in the case of trimethyl borate as the azeotrope mixture, a 50—50 molar mixture of the borate and alcohol.

The amount of material deposited in the wood and penetration of treatment varies according to the condition of the wood, the species of the wood and its moisture content. Furthermore the depth of treatment depends upon the ultimate use to which the wood is placed. I have ascertained that it is only necessary to incorporate into the wood an amount effective to accomplish the dimensional stability and wood protection that may be needed for the ultimate use and to a depth effective for each specific ultimate use.

According to the provisions of the patent statutes, I have explained the principle and mode of practicing my invention and have described what I now consider to be its best embodiments. However, I desire to have it understood that, within the scope of the appended claims, the invention may be practiced otherwise than as specifically described.

I claim:

1. A method of treating and protecting wood which comprises impregnating wood which is not substantially below its fiber saturation point with a tri(lower)alkyl borate.

2. A method according to claim 1 in which the tri-(lower)alkyl borate is trimethyl borate.

3. A method according to claim 2 in which said wood is at about its fiber saturation point.

4. Treated and protected wood having incorporated therein an effective amount of the reaction products resulting from the impregnation of said wood to an effective depth with a tri(lower)alkyl borate when it is not substantially below its fiber saturation point.

5. Treated and protected wood according to claim 4 in which the tri(lower)alkyl borate is trimethyl borate.

6. Treated and protected wood according to claim 5 in which the wood is treated at about its fiber saturation point.

References Cited
UNITED STATES PATENTS

| | | | |
|---|---|---|---|
| 2,041,655 | 5/1936 | Gunn | 167—38.6 |
| 2,689,259 | 9/1954 | Schechter | 260—462 |

MORRIS O. WOLK, *Primary Examiner.*

E. G. WHITBY, S. MARANTZ, *Assistant Examiners.*